Aug. 19, 1924.
G. F. KOLB
AUTOMOBILE BUMPER BRACKET
Filed Feb. 12, 1924  2 Sheets-Sheet 1
1,505,902
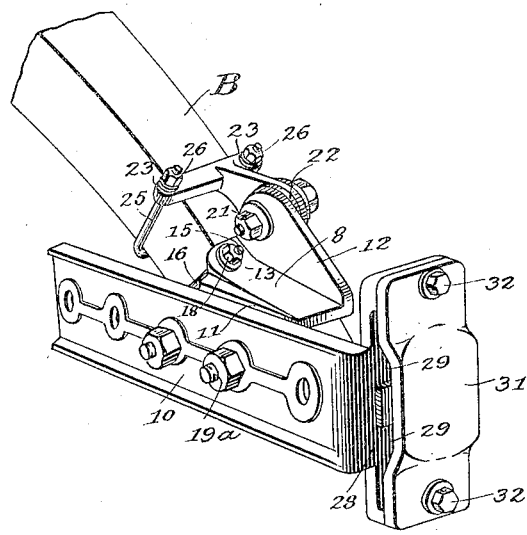
Fig. 1
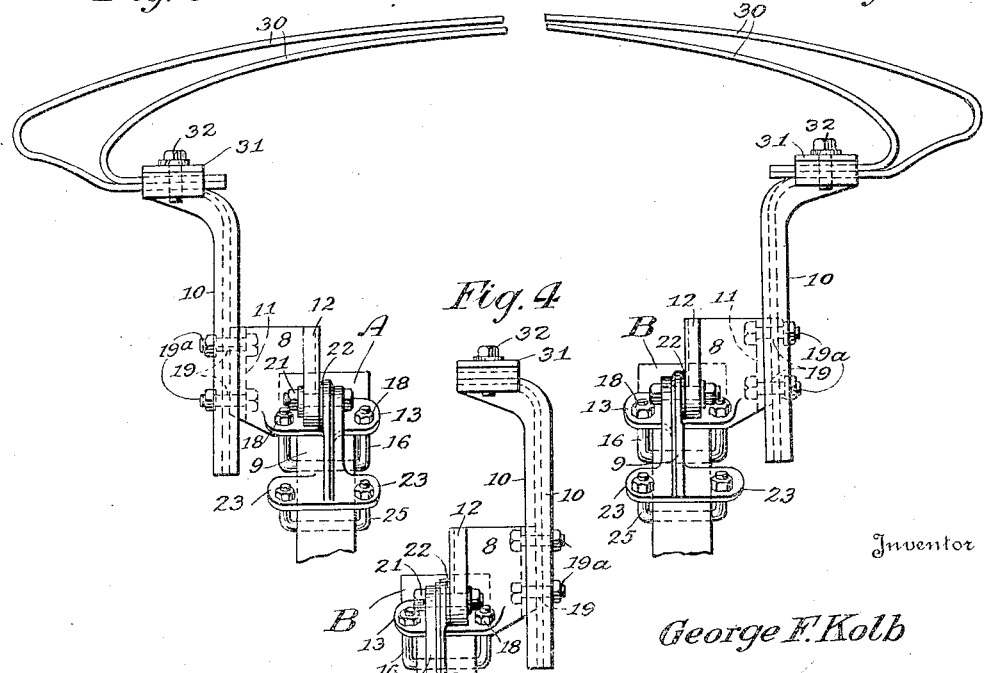
Fig. 3    Fig. 2
Fig. 4
Inventor
George F. Kolb
By Chamberlain & Newman
Attorney Aug. 19, 1924.
G. F. KOLB
1,505,902
AUTOMOBILE BUMPER BRACKET
Filed Feb. 12, 1924      2 Sheets-Sheet 2
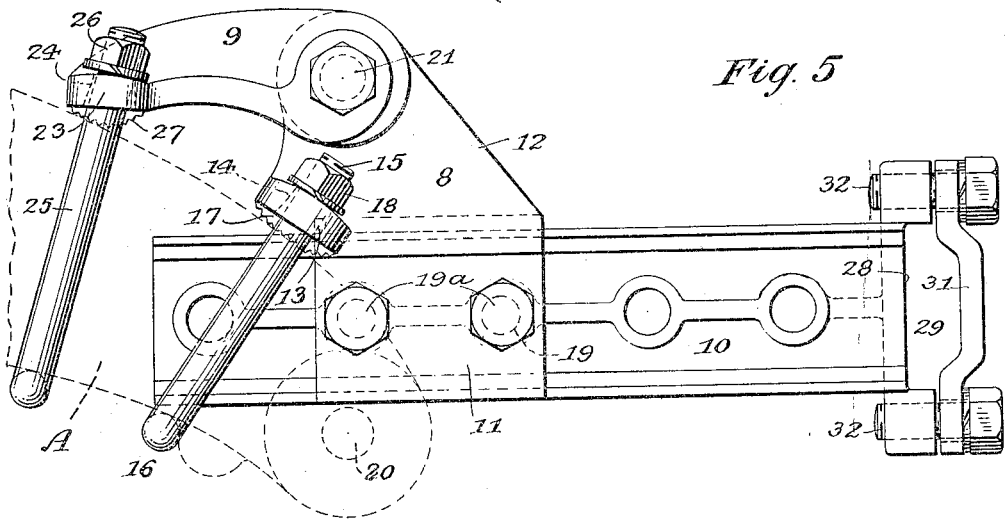
Fig. 5
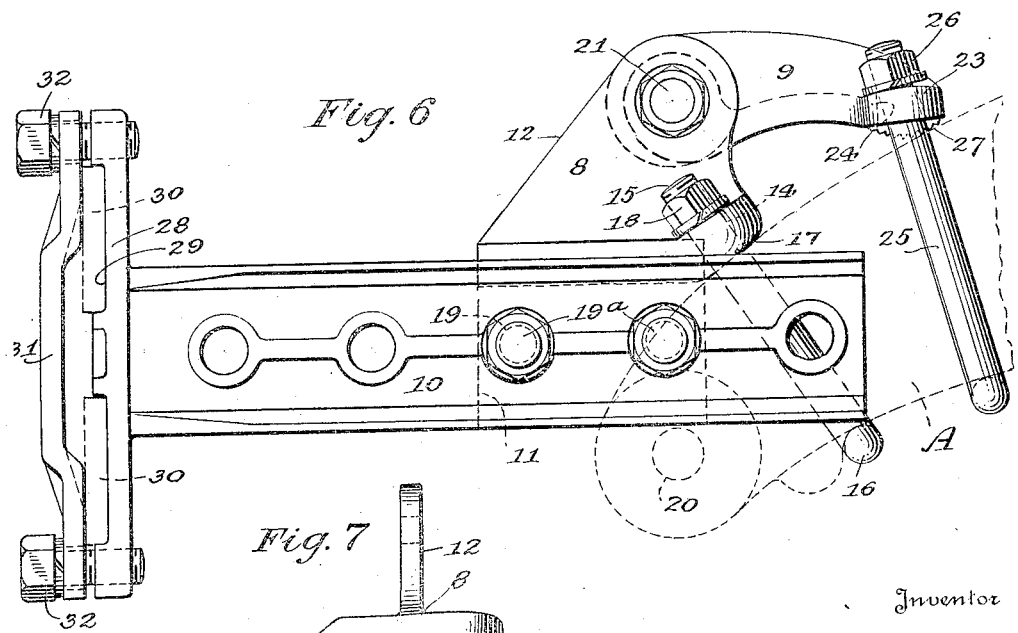
Fig. 6
Fig. 7
Inventor
George F. Kolb
By Chamberlain & Newman
Attorneys Patented Aug. 19, 1924.

1,505,902

UNITED STATES PATENT OFFICE.

GEORGE F. KOLB, OF FAIRFIELD, CONNECTICUT, ASSIGNOR TO THE BULLARD MACHINE TOOL COMPANY, OF BRIDGEPORT, CONNECTICUT, A CORPORATION OF CONNECTICUT.

AUTOMOBILE BUMPER BRACKET.

Application filed February 12, 1924. Serial No. 692,240.

*To all whom it may concern:*

Be it known that GEORGE F. KOLB, a citizen of the United States, and resident of Fairfield, in the county of Fairfield and State of Connecticut, has invented certain new and useful Improvements in Automobile Bumper Brackets, of which the following is a specification.

My present invention relates to automobile bumpers and more particularly to an improved form of bracket adapted for attachment to the rear end of an automobile chassis frame and designed particularly for carrying what are commonly known as spring bumper bars.

The present styles of automobiles obviously include many different rear end structures of chassis frames, bodies, springs, tire and trunk racks, which make it extremely difficult in many cases to attach spring bumpers to the rear of an automobile in a way to have them properly positioned to protect the car, trunk racks, etc., and still look well.

The object of the invention is to generally improve upon bumper brackets of this class and more particularly to provide a universal form of bracket which is adapted for attachment to many different styles and makes of cars, and including various forms of rear end structures.

I find that the chassis constructions of many of the higher priced cars include a pair of rear end spring hangers, which are usually formed integral with the side bar members of the chassis frame. These springs vary somewhat in length and likewise in shape, the more common forms being curved downward more or less, terminating in an eye to which the spring ends are hingedly connected.

My bracket has been particularly designed with a view of attachment to these rear end spring hangers and are adjustable to accommodate hangers of this type having different curves whereby the bumper bars may be positioned horizontally and at the desired distance from the ground. The invention is further adapted to the provision of either single or double spring bar bumpers.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Fig. 1 shows a perspective view of one of my bumper brackets attached to one of a pair of rear end hangers of an automobile chassis frame;

Fig. 2 shows a plan view of the opposite bracket, attached to a hanger, and having a portion of a spring bumper bar supported therein;

Fig. 3 is a similar plan view of the coacting bracket attached to the opposite hanger, and supporting the opposite end portion of a bumper bar;

Fig. 4 shows a further plan view of the bracket and hanger shown in Fig. 2, the bumper arm being in a reversed position to agree with that shown in Fig. 1;

Fig. 5 illustrates a side elevation of the bracket, on an enlarged scale, as seen from the right side of Fig. 3, and in position as if attached to a spring hanger.

Fig. 6 shows a side elevation as seen from the opposite side of Fig. 5 and illustrates a bracket adapted to carry a pair of bumper bars; and Fig. 7 is an end view of the bumper arm and bracket member to which it is attached, as seen from the right of Fig. 6.

As designed my improved bracket is made up of three principal parts, suitably connected together and provided with means for attachment to the rear end of the chassis frame of an automobile, and for the support of such spring bumper bars as they are designed to carry. Two of the said parts included in the bracket are adjustably connected together and are adapted to be adjustably attached to the rear spring hanger of a chassis frame. The bumper arm member of the bracket is disposed forward horizontally and may be constructed to support either one or two spring bumper bars. These parts are susceptible of being assembled and attached in several ways, better to accommodate the rear end construction of the particular car to which it is to be attached, or what is more frequently the case to accommodate and build around the tire rack or trunk rack structure on the rear of said car.

Referring in detail to the characters of reference marked upon the drawings, A and B represent the two rear end extended portions of a chassis frame, sometimes referred to as spring hangers. There are usually two of these extensions on a car that extend rearwardly and downwardly in more or less of a curved manner and serve for the attachment of the rear end springs. I apply one of my novel brackets to each of these hangers in a way to support the two end portions of a spring bumper bar on the rear of an automobile.

The several parts of the bumper bracket, for the two sides, are alike in construction, except that the members 8 and 9 are made up in rights and lefts, see Figs. 2 and 3, whereas the supporting arms 10 are not, but are made up in two styles to accommodate either a single bumper bar, see Fig. 5, or a double bumper bar, see Fig. 6. The supporting arm 10 is reversible and can be deflected outward, as shown in Figs. 2 and 3, or inward, see Figs. 1 and 4. While the bracket is made up in rights and lefts, yet it will be apparent that the position of the two brackets may be reversed. That is to say the bracket shown in Fig. 2 can be placed on the hanger of Fig. 3 or the bracket of Fig. 3 may be placed on the hanger of Fig. 2, to better accommodate the particular construction of the rear end of the automobile upon which it is to be placed. The member 8 of the bracket includes a body portion having a downwardly disposed flange 11, an upwardly disposed flange 12 and an outwardly disposed ear 13. This ear and the main body are provided with aligned holes 14—14 to receive the threaded ends 15 of a yoke 16 for attachment to the spring hanger. The under edge portion of the member 8 is provided with a series of curved serrations or teeth as at 17 to better engage the top edge of hangers A and B in a manner to form a positive grip and prevent the bracket member from slipping and coming loose. The threaded ends 15 of the yoke are provided with nuts 18 for clamping the yoke and member to the hanger. In practice this member 8 is first applied to the curved spring hanger and the other member 9 is connected later. This member 8 is thus positioned and secured so that its bolt holes 19—19 are in horizontal alignment and its bottom edge rests upon the shackle or spring bolt 20 of the spring hangers to which it is attached and bolts 19ª serve to clamp the bumper arm 10 to the downwardly disposed flange 11 of the member 8 thus making the arm reversible as before suggested.

The upwardly disposed flange 12 is provided with a hole to receive a clamping bolt 21 and by means of which the bracket member 9 is adjustably connected therewith. I preferably provide a fibre washer 22 upon the bolt between the adjacent surfaces of the said parts 8 and 9 in order to more rigidly clamp them together. This member 9 further includes oppositely disposed ears 23 having aligned holes 24 therein to receive a second yoke 25 adapted to engage the hanger and having threaded portions to pass through the holes 24 of ears 23 and provided with nuts 26 for clamping the bracket member and yoke to the spring hangers A or B. The under side of the forward end of the member 8 also includes a series of curved teeth or serrations as at 27 to better grip the top side of the hangers. It will thus be seen that the members 8 and 9 are adjustably connected together and each clamped to a hanger in a manner to be firmly supported and in a way to dispose the bottom edge portion of the member 8 in a horizontal position to properly support the bumper arm in a like manner. The adjustable connection 21 between the parts 8 and 9 better adapts the bracket to be attached to spring hangers of different shapes and curves.

The bumper arm 10 is provided upon its forward end with a vertically disposed face 28 in which is formed one or more pockets 29 to receive the spring bumper 30. This face is further provided with screw holes for the attachment of the clamping plate 31 by means of the screws 32 and by means of which the aforesaid bumper bar is attached.

Having thus described my invention what I claim and desire to secure by Letters Patent is:

1. An automobile bumper bracket for attachment to the frame end of an automobile comprising a pair of bracket members having projected flange portions, one of the pair forming an attaching face for a bumper bar and the other a fixed member of an adjustable connection, a clamping bolt for securing one of the bracket members to a chassis frame, one of the bracket members being hingedly connected to the other member, and a bumper bar secured to the first named bracket member.

2. An automobile bumper bracket for attachment to the frame ends of an automobile frame, comprising a pair of bracket members hingedly connected together, separate clamping means for each of said bracket members adapted to secure the same to the end of a chassis frame, a bumper arm detachably and adjustably connected to one of said bracket members and having means to support a bumper bar therein.

3. An automobile bumper bracket for attachment to the end of an automobile, comprising a bracket member having a pivotal ear, a yoke bolt attached thereto and for encircling the end of a chassis frame, said bracket including aligned holes for the attachment of a bumper arm, a second bracket member pivotally connected to said ear and means for clamping the free end portion of said last named member to the chassis frame, a horizontally disposed bumper arm adjustably attached to the holes of the first mentioned bracket and provided with clamping means for the support of a spring bumper bar therein.

4. An automobile bumper bracket comprising two bracket members hingedly connected together, independent attaching means for each of the said bracket members whereby they may be secured in a fixed position with relation to the chassis frame a reversible bumper arm either side of which is adapted to be attached to one of said bracket members and provided with clamping means for supporting a bumper bar therein.

5. An automobile bumper bracket comprising two bracket members hingedly connected together, independant attaching means for each of the said bracket members whereby they may be secured in a fixed position with relation to the chassis frame, a reversible bumper arm either side of which is adapted to be attached in a pocket of said bracket member and provided with clamping means for supporting a bumper bar therein.

6. An automobile bumper bracket for attachment to the rear end of an automobile frame, comprising a bracket member having a pivotal ear, means for attaching said bracket to the end of a chassis frame, a second bracket member pivotally connected to said ear, means for clamping the free end portion of said last named bracket member to the chassis frame, and a horizontally disposed bumper arm attached to one of said brackets and provided with clamping means for the support of a spring bumper bar therein.

7. An automobile bumper bracket comprising two bracket members hingedly connected together, one of said bracket members having a series of curved serrations to bear upon a chassis frame, attaching means for each of said bracket members whereby they may be secured in a fixed position with relation to the chassis frame, a bumper arm adapted to be attached to one of said bracket members and provided with clamping means for supporting a bumper bar thereon.

Signed at Bridgeport, in the county of Fairfield and State of Connecticut, this 9th day of February, A. D. 1924.

GEORGE F. KOLB.

Witnesses:
C. M. NEWMAN,
FLORENCE C. ALLING.